US010623467B2

(12) United States Patent
Väänänen

(10) Patent No.: US 10,623,467 B2
(45) Date of Patent: Apr. 14, 2020

(54) METHOD AND SYSTEM FOR TRANSFERRING DATA BETWEEN DEVICES

(71) Applicant: Piceasoft Oy, Tampere (FI)

(72) Inventor: Jani Väänänen, Kangasala (FI)

(73) Assignee: Piceasoft Oy, Tampere (FI)

( * ) Notice: Subject to any disclaimer, the term of this patent is extended or adjusted under 35 U.S.C. 154(b) by 251 days.

(21) Appl. No.: 15/903,211

(22) Filed: Feb. 23, 2018

(65) Prior Publication Data

US 2019/0068686 A1 Feb. 28, 2019

(30) Foreign Application Priority Data

Feb. 24, 2017 (FI) ..................................... 20175177

(51) Int. Cl.
*G06F 21/60* (2013.01)
*H04L 29/06* (2006.01)
*H04L 29/08* (2006.01)
*H04L 9/08* (2006.01)
(Continued)

(52) U.S. Cl.
CPC ............ *H04L 67/04* (2013.01); *G06F 21/602* (2013.01); *H04L 9/0861* (2013.01);
(Continued)

(58) Field of Classification Search
CPC ........... H04L 63/08; G06F 21/60; G06F 21/00
See application file for complete search history.

(56) References Cited

U.S. PATENT DOCUMENTS 7,356,694 B2 * 4/2008 Mayo .................. H04L 63/0815 713/159
7,890,634 B2 * 2/2011 Jiang ..................... H04L 9/0825 709/227

(Continued)

FOREIGN PATENT DOCUMENTS

EP 3131323 A1 2/2017

OTHER PUBLICATIONS

Henry, A. "How to Upgrade to a New Android Phone and Take Everything with You", lifehacker.com, available online Jan. 20, 2017, https://web.archive.org/web/20170120052957/http://lifehacker.com/5843206/how-to-upgrade-to-a-new-android-phone-and-take-everything-with-you, 14 pages.

(Continued)

*Primary Examiner* — Izunna Okeke
(74) *Attorney, Agent, or Firm* — Ziegler IP Law Group, LLC

(57) ABSTRACT

The present disclosure relates to methods, devices, systems and computer program products for transferring data between a first electronic device (110) and a second electronic device (115). A session token is formed, the session token identifying a data transfer session between the first electronic device (110) and the second electronic device (115). First, a local data transfer connection is established in the data transfer session between the first electronic device (110) and the second electronic device (115). A first set of data is transferred from the second electronic device (115) to the first electronic device (110) over the local communication connection, and the connection is ended. Then, in the data transfer session a second set of data is transferred from the second electronic device (115) to a network server system (120). A remote communication connection is established in the data transfer session between the network server system (120) and the first electronic device (110), and the second set of data is transferred from the network server system (120) to the first electronic device (110) over the remote communication connection.

14 Claims, 5 Drawing Sheets

(51) Int. Cl.
    *H04L 9/32*         (2006.01)
    *H04W 12/04*      (2009.01)
    *H04W 4/20*       (2018.01)
    *H04W 12/00*      (2009.01)
    *H04W 4/50*       (2018.01)
    *H04W 8/18*       (2009.01)

(52) U.S. Cl.
    CPC ........ *H04L 9/3213* (2013.01); *H04L 63/0428* (2013.01); *H04L 63/062* (2013.01); *H04L 63/18* (2013.01); *H04L 67/141* (2013.01); *H04L 67/146* (2013.01); *H04L 67/28* (2013.01); *H04W 4/20* (2013.01); *H04W 4/50* (2018.02); *H04W 8/18* (2013.01); *H04W 12/002* (2019.01); *H04W 12/04071* (2019.01); *H04W 12/00522* (2019.01)

(56) References Cited

U.S. PATENT DOCUMENTS

2015/0319144 A1* 11/2015 Barton ................ H04L 63/0428
                                                                                      713/168
2016/0253274 A1     9/2016 Huang et al.

OTHER PUBLICATIONS

Gilson, D. "How to use Carbon App Sync and Backup", androidauthority.com, available online Jun. 19, 2016, Retrieved from https://web.archive.org/web/20160619154152/http://www.androidauthority.com:80/how-to-use-carbon-backup-185924, 5 pages.

Finnish Patent and Registration Office, Opinion on Patentability, Application No. 20175177, dated Sep. 27, 2017, 8 pages.

* cited by examiner

METHOD AND SYSTEM FOR TRANSFERRING DATA BETWEEN DEVICES

BACKGROUND

Mobile devices like phones, tablets, portable computers and other electronic devices are abundant, amounting to billions of units sold every year. A person may own many such devices, and may purchase new electronic devices to replace old ones frequently. This trend has created the need to re-use and recycle the old devices. For example, used mobile phones are frequently sold to a new owner. To sell the device to a new owner, the device needs to be checked and some technical operations on the device may need to be performed. In addition, the contents and possibly the settings of the old device need to be moved to the new device, such that they can be accessed by the user, but not by the new owner of the old device. These operations take time, and yet the operations need to be done in a reliable manner.

It is possible to transfer data from one device to another either directly or by using a cloud service offered by the device manufacturer, or another cloud service. In such operations, the owner of the device needs to go through steps of configuring the transfer from one device to the cloud and from the cloud to another device, and the transfer may take a long time. The patent publication US2016253274 describes an arrangement where a mobile phone retailer may transfer the data to a user's cloud service.

A user may find such ways of copying data between electronic devices to be unreliable or difficult to use, and the chance for user error is significant. There is a need for a solution that provides an improved way to transfer data between electronic devices.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

The aspects of the disclosed embodiments relate to methods, devices, systems and computer program products for transferring data between a first electronic device and a second electronic device. A session token may be formed. First, a local data transfer connection may be established between the first electronic device and the second electronic device. A first set of data may be transferred from the second electronic device to the first electronic device over the local communication connection. A second set of data may be transferred from the second electronic device to a network server system. Then, a remote communication connection may be established between the network server system and the first electronic device, and the second set of data is transferred from the network server system to the first electronic device over the remote communication connection. The session token may identify a data transfer session between the electronic device and the second electronic device. All the above transfers may be considered to be taking place in the same data transfer session. An electronic device may have software in its memory that controls the device, or the electronic device may be remotely controlled to carry out the operations. For example, a data transfer host and/or a network server system may control the first and second electronic devices in various phases.

DESCRIPTION OF THE DRAWINGS

In the following, various embodiments of the present disclosure will be described in more detail with reference to the appended drawings, in which.

DESCRIPTION

In the following, several embodiments of the present disclosure will be described in the context of evaluating the condition of personal portable electronic communication devices and computers. It is to be noted, however, that the invention is not limited to such devices, but may be used with any computer or electronic device having a number of components and being capable of interacting with the user either directly or through another device. In fact, the different embodiments may have applications in any environment where evaluation of the condition of an electronic device is required.

It has been noticed in this present disclosure that users may consider doing a transfer of data over a local connection from one device to another to be cumbersome and difficult to perform. If such a transfer is performed by a service person on behalf of the user, it may take a long time, during which the user may have no access to his/her device.

Figure 1A:
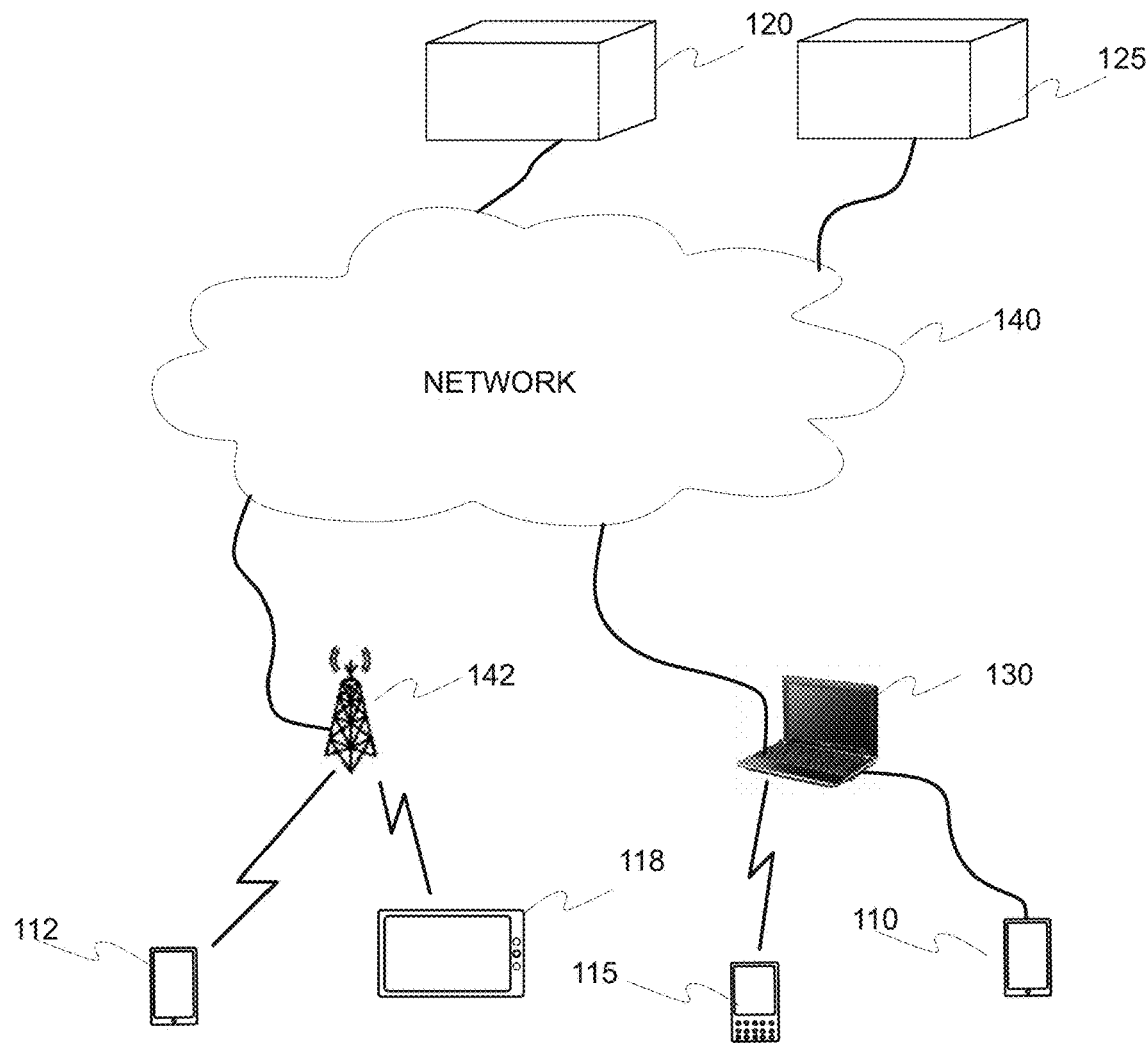
FIGS. 1*a* and 1*b* show a system and devices for transferring data between electronic devices.
Figure 1B:
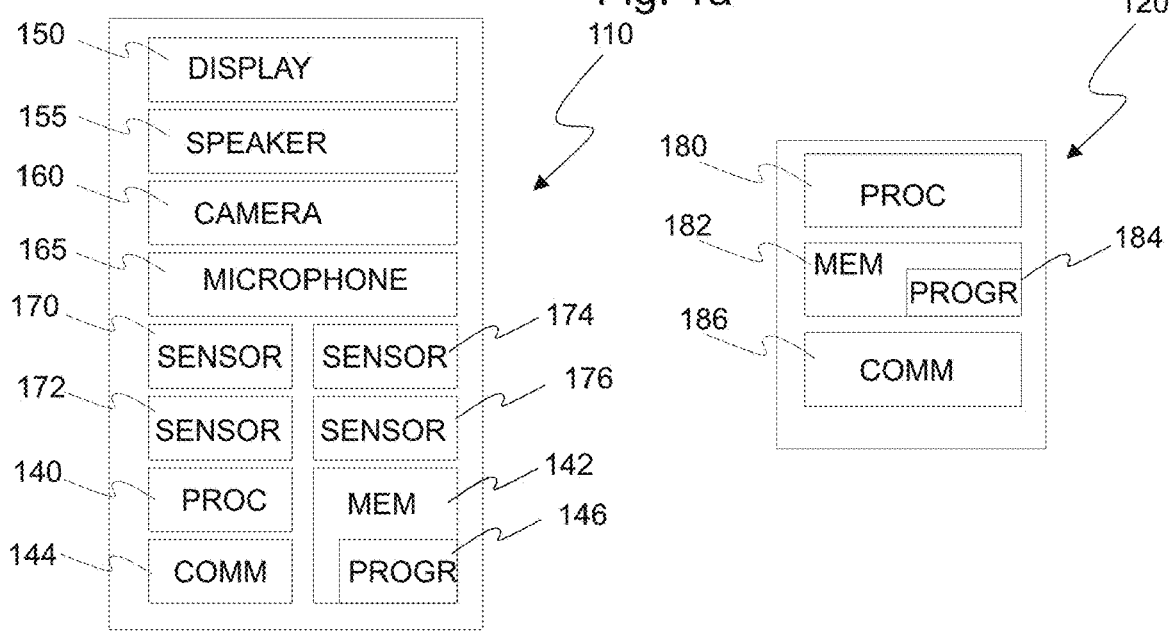

FIGS. 1*a* and 1*b* show a system and devices for transferring data between electronic devices. The different devices 110, 112, 115, 118 may be connected to a network 140, for example the internet, or a mobile communication network, or a local area network. The devices 110, 112, 115, 118 may be able to communicate with each other over the network connection, or directly, or using a host device 130 or a combination of such. The devices may also operate in a standalone or local connection mode, for example the electronic device may be used to decode data without a network connection.

There are different devices shown in FIG. 1*a*. The electronic devices 110, 112, 115, 118 with which data is being transferred may comprise any computer devices with one or more sensors and/or one or more input/output elements. Such devices may be personal computers 130, mobile communication devices such as mobile phones 110, 115 and tablets 112, 118, wearable devices like watches, bracelets, active glasses, augmented reality devices, internet-of-things capable devices and the like. Such devices may be directly connected to the network 140, e.g. with the help of network elements like base stations 142, or they may be connected to another device such as a data transfer host 130 that in turn may be connected to the network. The connections between the network and the different devices may be wired or wireless such as mobile communication connections, wireless local area network (WLAN) connections, short range local radio connections such as Bluetooth or optical connections, device-to-device connections such as USB, FireWire or ThunderBolt. For example, two electronic devices 110, 115 may be connected to the data transfer host 130 over a local wireless connection or a wired connection like USB. The network 140 and/or the second device 130 may provide input, e.g. commands, to the electronic device so that it may carry out operations of the data transfer. Alternatively or in addition, the electronic device may receive such input from the user. The electronic device may also request authentication of the user, e.g. through an input of a passcode, a fingerprint recognition, a face recognition or a voice recognition, or another authentication to prove that the user is authorized to transfer data to or from the electronic device or to use an application for this. The electronic device may have an application for controlling the electronic device when data is being transferred, for creating, modifying and storing of the data, or an identifier or link to such. The application may also cause the electronic device to interact with the user.

There may be one or mode servers 120, 125 or data transfer hosts 130 connected to the network 140 and having a communication connection with the electronic device 110, 112, 115, 118, with other servers 120, 125 and/or the data transfer host 130. Such servers may alone or together with other devices like the data transfer host 130 or one or more electronic devices 110, 112, 115, 118 form a server system for transferring data from one electronic device to another electronic device. For example, the server system may control an electronic device or the data transfer host 130, or instruct the user. The server system may also store data received from the electronic device. The server system may also encode and/or decode the data being transferred. The server system may provide the data or a token of the same to an electronic device of the user, or through a network service to the user.

A data transfer host 130 may be used to control the data transfer to the first electronic device 110 from a second electronic device 115. For example, the data transfer host may be a computer (a personal computer or a dedicated data transfer computer system) at a store where the electronic devices 110 are being sold. When the user arrives at the store, he/she brings the old electronic device 115 that may be sold to the store and eventually a new owner. Alternatively, the user may wait at the store for the data to be transferred away from the old device so that he/she can take the old device with him/her. After purchasing the new device 110, the store customer servant or the user may use the data transfer host 130 to transfer data from the old device to the new device. For this, the two devices may be connected to the data transfer host 130 over a local communication connection. The data transfer host 130 may then arrange for the data transfer for example so that the most important and/or smallest data (a first data set) to be transferred is transferred from the old device 115 to the new device 110 over the local communication connection. The rest of the data (a second data set) may be retrieved from the old device 115 over the local connection or over another connection, possibly temporarily stored at the data transfer host 130, and then stored for later access to a server system 120, 125. This transfer may take some time, but the user may then leave the store with the new device after the first data set has been transferred, thus making the switching of the devices faster. Additionally, the old device may be erased after the data has been transferred away from the old device. A certificate may be generated indicating that the old device has been erased. Also, since the customer servant may be helping and the user can immediately verify that the first set of data has been transferred correctly, the transfer may be understood to be more reliable. The user may receive a token, e.g. stored on the new device 110 or by e-mail or other message, such that the second set of data can be accessed later using the token, and downloaded to the new device 110.

FIG. 1b displays block diagrams of an electronic device and a server system. The electronic device 110, 112, 115, 118 may comprise input/output elements such as a display 150, a speaker 155, a camera 160 and a microphone 165. The electronic device may also comprise different sensors, for example an accelerometer 170, a magnetometer 172, a proximity sensor 174 and an ambient light sensor 176. The electronic device 110, 112, 115, 118 may comprise one or more processors 140 and memory 142 including computer program code 146. The memory 142 and the computer program code 146 may be configured to, with the one or more processors, cause the electronic device to perform the operations according to the present description, for example the methods in FIGS. 2a, 2b and 2c. The electronic device may comprise a communication module 144 for communicating with the network and/or the server system 120, 125 and/or a second device such as a data transfer host 130.

The electronic device 110 may be configured to establish a local data transfer connection between the (new) electronic device 110 and a second (old) electronic device 115, and transfer a first set of data from the second electronic device 115 to the electronic device 110 over said local communication connection. This local communication connection may also be such that the two devices are connected to a data transfer host through their respective local communication connections. Once this is done, the local communication connection may be ended. A session token may then be used to establish a remote communication connection between a network server system 120, 125 and the electronic device 110. A second set of data may then be received from the network server system 120, 125 to the electronic device 110 over the remote communication connection. This second set of data originates from the second electronic device 115 and has been transferred to the server system 120, 125 from the second electronic device 115. The session token may identify a data transfer session between the electronic device 110 and the second electronic device 115. All the above transfers may be considered to be taking place in the same data transfer session.

The system for transferring data from one electronic device to another electronic device may comprise one or more parts 110, 112, 115, 118, 120, 125, 130. For example, there may be a server system with one or more servers 120, 125 connected over a network or through a data transfer host 130 to an electronic device 110, 112, 115, 118. A server system or a data transfer host may comprise at least one processor 180, memory 182 including computer program code 184, the memory 182 and the computer program code 184 configured to, with the at least one processor, cause the system to carry out the operations according to the current description, e.g. as in FIGS. 2a, 2b and 2c.

The server system 120, 125 and/or the data transfer host 130 may comprise at least one processor, memory including computer program code, the memory and the computer program code configured to, with the at least one processor, cause the system and/or the host to form a session token and to establish a local data transfer connection between the first electronic device (new device) and the second electronic device (old device). The system or host may be configured to transfer a first set of data from the second electronic device to the first electronic device over the local communication connection, and when this is completed, end the local communication connection. The system or host may then transfer a second set of data from the second electronic device to a network server system 120, 125 to be accessed and downloaded to the first electronic device 110. The system (and/or host and/or device) may establish a remote communication connection between the network server system and the first electronic device 110, and transfer the second set of data from the network server system to the first electronic device over the remote communication connection. The session token may identify a data transfer session between the electronic device 110 and the second electronic device 115. All the above transfers may be considered to be taking place in the same data transfer session.

The different devices 110, 112, 115, 118, 120, 125, 130 in FIGS. 1a and 1b may comprise software and circuitry for carrying out the different operations. Such software may be loaded into the memory of the device, and then executed on the processor of the device. A computer program product for use with the devices of FIGS. 1a and 1b may be embodied on a non-transitory computer readable medium, and may comprise computer program code configured to, when executed on at least one processor, cause a device or a system of FIGS. 1a and 1b to carry out methods and operations as described in the present description, e.g. for FIGS. 2a, 2b and 2c.

Figure 2A:
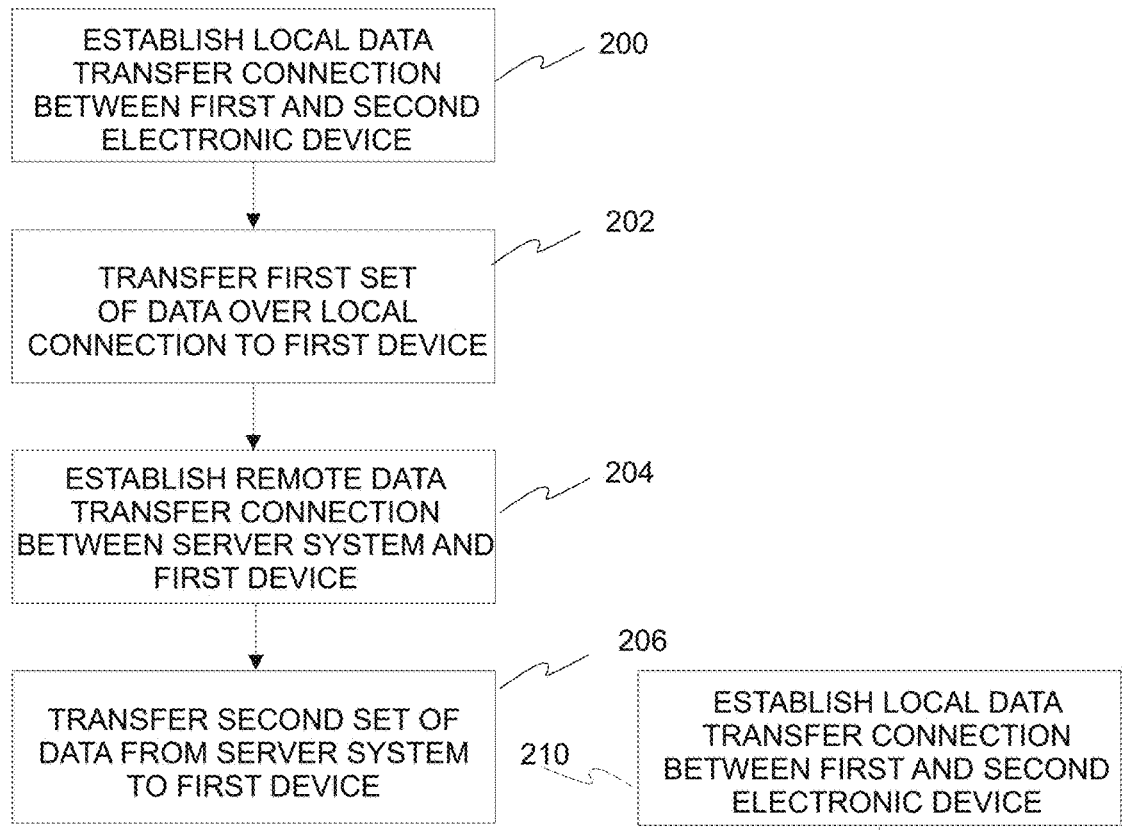
FIGS. 2*a*, 2*b* and 2*c* show flow charts of methods for transferring data between electronic devices.

FIG. 2a shows a flow chart of a method for transferring data to an electronic device. In phase 200, an electronic device establishes a local data transfer connection between the electronic device and a second electronic device. A data transfer session may be defined at this point or later such that the data being transferred from the second electronic device 115 to the electronic device 110 takes place in the same session. Within the session, the data may be transferred in different sets over different communication connections. In phase 202, the electronic device may then receive a first set of data from a second electronic device over the local communication connection. The electronic device may also receive a token of the data transfer session. The session token may identify the data transfer session between the electronic device and the second electronic device. The token may act as an access credential or a link to the data transfer session and/or the data being transferred. The token may be used as an encryption or decryption key, or a key may be formed using the token. After the local transfer, the local communication connection may be ended. In phase 204, the electronic device may establish a remote communication connection between a network server system and the electronic device. This remote connection may be understood to be part of the same data transfer session as the local communication connection. The session token may be used to form and/or encrypt the data and/or the connection. For example, the electronic device may retrieve the session token from a memory into which it has been stored, receive the token by a message, receive the token from the user or from a network service, or by taking a picture of an optical code such as a QR code. In phase 206, the electronic device may then receive a second set of data from a network server system over the remote communication connection. The second set of data originates from the second electronic device, and has been transferred to the server system from the second electronic device. If the electronic device has received the second set of data in encrypted form, encrypted at least partially by using a session encryption key, the electronic device may decrypt the second set of data, and store the decrypted second set of data in the electronic device.

The session token may be created when the local transfer is started, or during the initial phases of the transfer session, or before the transfer of the second set of data to the first electronic device is started. The creation of the session token may trigger or be triggered by the creation of the data transfer session at the server system 120, 125.

Figure 2B:
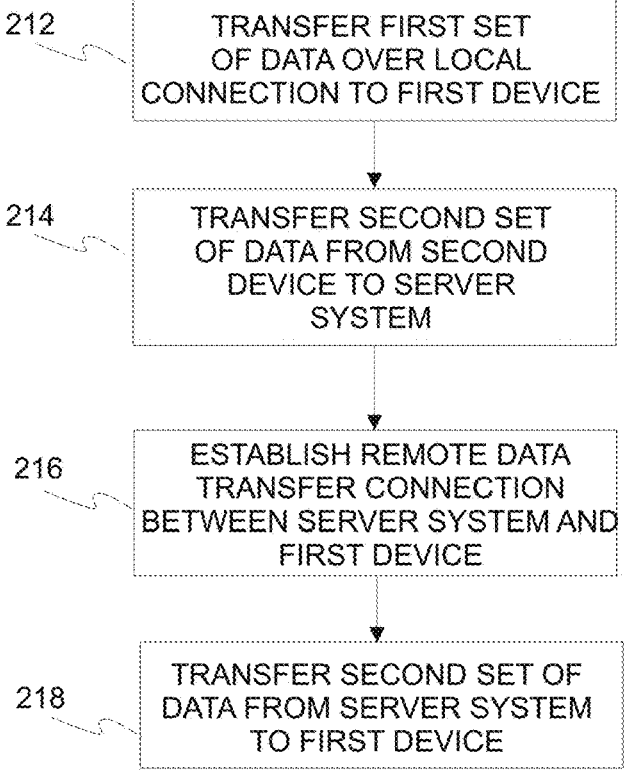

FIG. 2b shows a flow chart of a method for transferring data between electronic devices in a data transfer system. The system may comprise one or more servers 120, 125 and/or a data transfer host 130 and/or two or more electronic devices 110, 112, 115, 118. A data transfer session may be defined in the beginning or later such that the data being transferred to the device takes place in the same session. Within the session, the data may be transferred in different sets over different communication connections.

In phase 210, the system may establish a local data transfer connection between the first electronic device and the second electronic device for the purpose of transferring data from the second device to the first device. In phase 212, the system may transfer a first set of data from the second electronic device to the first electronic device over the local communication connection. The local communication connection may be a wired or wireless connection, and a data transfer host may be part of this connection. The local communication connection may also use an internet connection or a mobile communication network while the first and second electronic devices are physically close to each other and controlled by a user of the system. This data may be selected by the user, or the types of data to be transferred in this phase may be selected. The selection may also be automatic, and the data to be transferred over the local connection may be selected by the system using data type or data unit size as a criterion. The first data set transferred over the local connection may comprise for example contacts, calendar, messages, bookmarks and/or other small data items. The first data set may comprise data items that can only be transferred over the local connection (e.g. wired connection), but not over the remote connection.

The system may also transfer a token of the data transfer session to the first electronic device. The session token may identify the data transfer session between the electronic device and the second electronic device. The token may act as an access credential or a link to the data transfer session and/or the data being transferred. The token may be used as an encryption or decryption key, or a key may be formed using the token. Alternatively, the system may transfer a session key to the first electronic device.

After the local transfer, the local communication connection may be ended, for example by disconnecting the first electronic device or leaving the facility where the local connection is available. The local communication connection between the second electronic device and the system may still continue.

In phase 214, the system may transfer a second set of data from the second electronic device to a network server system to be accessed later. For example, the large data items on the second electronic device may be transferred in this phase, such as the photographs, videos, music files and others. That is, the second set of data may be different from the first set of data. The second set of data may comprise all of the data that has not been transferred in phase 212, or a part of the non-transferred data. The second set of data may additionally also comprise data that has already been transferred in phase 212. In phase 216, the system may establish a remote communication connection between the network server system and the first electronic device. For example, the remote communication connection may comprise an internet connection, or a mobile communication network connection. In phase 218, the system may transfer the second set of data from said network server system to said first electronic device over said remote communication connection.

Figure 2C:
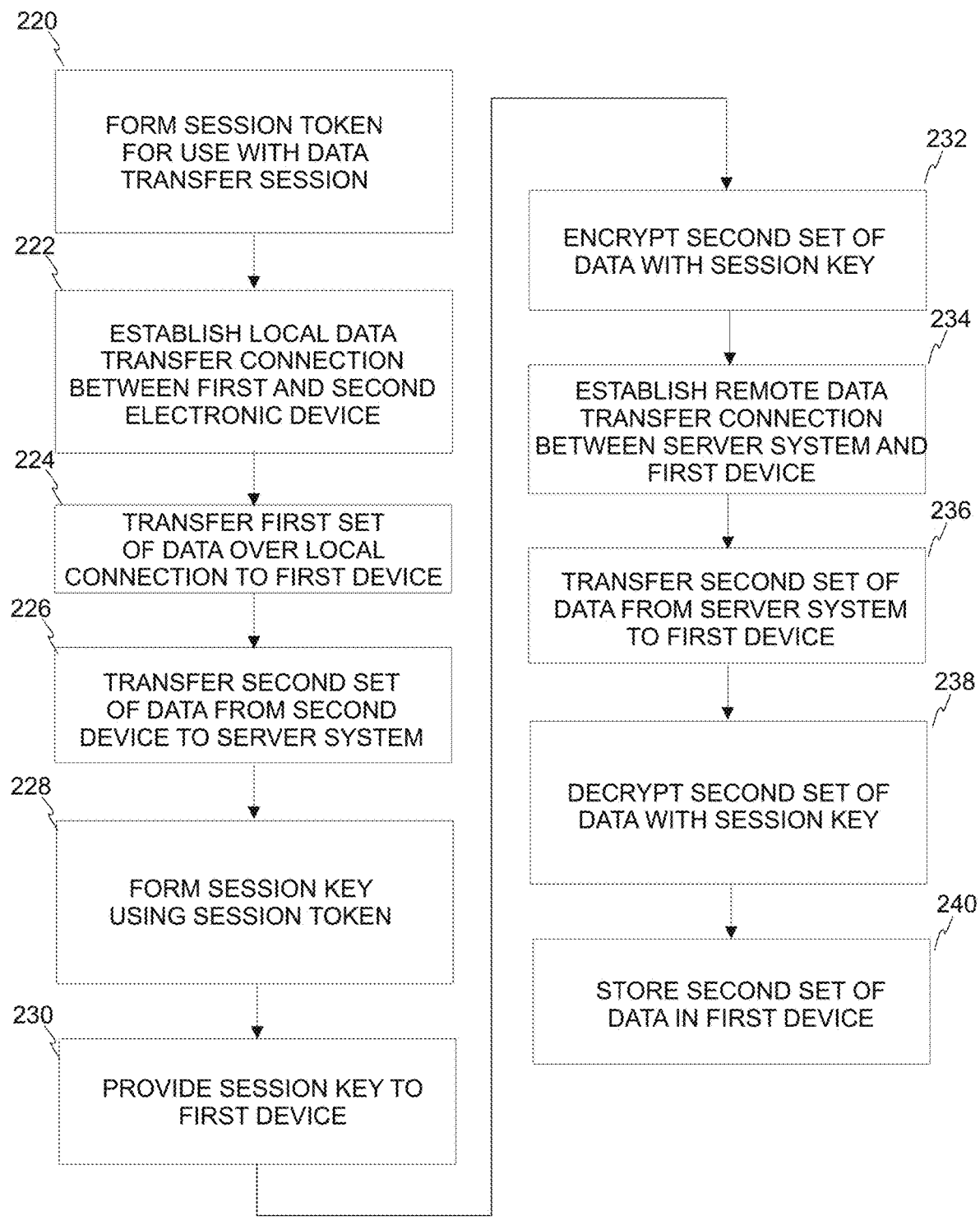

FIG. 2c shows another flow chart of a method for transferring data between electronic devices in a data transfer system. The system may comprise one or more servers 120, 125 and/or a data transfer host 130 and/or two or more electronic devices 110, 112, 115, 118. A data transfer session may be defined in the beginning or later such that the data being transferred to the device takes place in the same session. Within the session, the data may be transferred in different sets over different communication connections.

In phase 220, the system may form a session token. The session token may identify the data transfer session between the electronic device and the second electronic device. The token may act as an access credential or a link to the data transfer session and/or the data being transferred. The token may be used as an encryption or decryption key, or a key may be formed using the token. In phase 224, the system may transfer a first set of data from the second electronic device to the first electronic device over the local communication connection, as explained earlier. In phase 226, the system may transfer a second set of data from the second electronic device to a network server system as described earlier.

In phase 228, the system may form a session key using the session token. For example, the session token may be used as the session key, or a session key may be formed by using the session token, or a session key may be formed and associated with the session token. As explained earlier, the session token may identify the data transfer session between the electronic device and the second electronic device. The token may act as an access credential or a link to the data transfer session and/or the data being transferred. In phase 230, the system may provide the session key to the first device. This may happen over the local communication connection or through another connection, by using the camera of the device or any other way.

After the local transfer, the local communication connection may be ended.

In phase 232, the system may encrypt the second set of data at least partially by using the session key or a key related to the session key for encryption. The session encryption key may be related to the session token. In phase 234, the system may establish a remote communication connection between the network server system and the first electronic device, as explained earlier. In phase 236, the system may transfer the second set of data from said network server system to said first electronic device over said remote communication connection. In phase 238, the system may decrypt the encrypted second set of data for storing on the first electronic device. This decryption may take place at the server or at the first electronic device, or at another device connected to the first electronic device. In phase 240, the second set of data may be stored in the first electronic device, or it may be stored fully or partially at a cloud service associated with the first electronic device.

In the above, some of the phases may be omitted, or they may be carried out in different order. Also, there may be options and alternatives to the phases. For example, the decrypting of the encrypted second set of data may happen by a third device, the third device being connected to the first electronic device over a local communication connection. Such a device may be for example a personal computer. The decrypting of the encrypted second set of data may be carried out by the network server system, and the second set of data may be transferred to the first electronic device over said remote communication connection, where the remote communication connection is a secure connection. As mentioned, the session token may be used as a session encryption key, for encrypting and/or decrypting data, and/or to form a secure connection. The session encryption key may be formed by a key forming algorithm using the session token as a seed. The local communication connection comprises at least one or a combination of the group of a wired connection, a short-range radio connection, an optical connection and a local area network connection. The session token may be transferred into the first electronic device over the local communication connection and be used in forming the remote communication connection and/or in decrypting data. The session token may be stored into a network server system, and used for said transferring of said second set of data to said first electronic device.

Optionally, before, during or after the data transfer, the condition of the second electronic device may be determined, e.g. for the purpose of determining a need for technical service to be carried out. The condition of an electronic device may be determined by instructing the user to move the device between an idle mode and an active use mode (the idle mode may be considered to be one use mode). These modes may be such that they are simple modes where the device is when it is being used normally by the user. Thus, the users may understand such modes more easily, and consequently, the modes and the movement between the modes may be universally rather similar between different users. For example, the idle mode is such that the device lies in a horizontal orientation with the screen upwards so that the user can see it. The use mode may be such that the user holds the device in his/her hand, the device is in an essentially vertical orientation on the user's ear so that the user can speak to the device and hear the sound coming from the speaker (using the device as a telephone). These two use modes are well defined and understandable to the user, and thus they provide reliable positions and orientations, as well as a predictable movement path in between, for determining the condition of the device.

When the device is in the idle mode, being moved between the idle mode and the use mode, or in the use mode, signals from one or more sensors and input/output elements of the device may be gathered and thus the functioning of the sensors and elements can be determined. When the device is being physically moved and it's orientation is being changed between the idle and use modes, signals from the accelerometer, gyroscope and magnetometer and other components may be recorded and their correctness may be determined, e.g., by comparing the signals to earlier recorded or predefined baseline signals. Likewise, the display, touch screen, stylus, keyboard, speaker and microphone may be used to interact with the user, and from the correctness of the user's interaction or the signals from these elements it may be determined that one or more of the elements is not functioning. The different modalities may be alternated between when the user is being instructed or interacted with. For example, instructions to the user when the device is in idle mode may be given on the screen, e.g. by text or image or video, and the instructions in the use mode may be given by audio output through the speaker. In this manner, the functioning of different modalities may be determined quickly in the same sequence.

For example, when an instruction is being given to a user, if the user is not able to hear the instruction, the user is not able to interact with the device as expected. Yet further, the user may be asked to give input, e.g. by touch screen or speech, to the device, and if the device is not able to receive such input, it may be determined that the input element is not functioning properly. One or more such determinations may be carried out simultaneously. For example, signals from the motion sensors and the ambient light sensor or camera or the proximity sensor may be recorded simultaneously and compared to a baseline signal or parameters.

A method of determining the condition of an electronic device may comprise receiving a first input to the electronic device to commence said determining the condition of said electronic device, in response to receiving said first input, providing a first instruction to a user, said first instruction comprising guidance in a first output modality to move said electronic device from a first use mode to a second use mode, during movement of said electronic device between said first use mode and said second use mode, receiving one or more signals from at least one sensor or an input element of said electronic device, and storing data indicative of said signals to a memory, determining said condition of said electronic device using said data indicative of signals stored in said memory, and providing information of said condition of said electronic device to a user. When said electronic device has been moved to said second use mode, a second instruction may be provided to said user using a second output modality.

Such an operation as described above may be easy for the user to perform, and thus may be more reliable than earlier methods. Also, due to the complex movement path and different simultaneous operations and interactions with the user are commonplace, the method may also be fast, and more difficult to spoof.

Carrying out the determining of the condition of the second electronic device before the data transfer may also make it faster to perform all the necessary operations in a situation where the second electronic device is to be sold further to another person after the data has been transferred.

Figure 3:
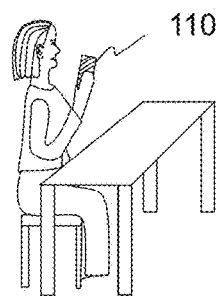
FIG. 3 illustrates a transfer of data between electronic devices.
Figure 3:
Figure 3:
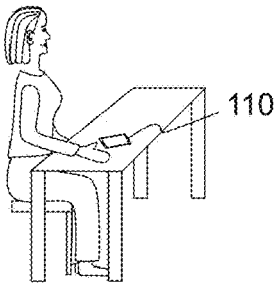
Figure 3:

FIG. 3 illustrates a transfer of data between electronic devices. The user may be interacting with the electronic device 110 to download the second set of data, as described earlier. The electronic device 110 may also contain the first set of data transferred to it earlier from the second electronic device 115. The electronic device 110 may provide an instruction to the user in phase 310, so that the user can use the electronic device to initiate the data transfer for the second set of data. For example, the user may be asked to enter a session token received from the store where the device 110 was purchased, or to scan a code such as a QR code with the device camera. Using this token, the device 110 can gain access to the network server system to start the download of the second set of data. Optionally, the user may be offered to select the data to be downloaded. In phase 320, the transfer of the second set of data is ongoing and the device 110 indicates the progress to the user so that the user knows which data is already available on the device and can use the device accordingly. In phase 330, the device 110 is in background download mode where the progress of the download may be shown on the idle screen, but the user may continue to use the device 110 as usual. When the transfer is complete in phase 340, the device may inform the user so that the user knows that all of the data has now been transferred. Any errors may also be indicated to the user.

In the above, the transfer may be carried out by an application residing on the device. If the application is already available on the device, the transfer of the second set of data may be initiated automatically when the application receives information from the server system that there is data available. In such a case, the device 110 may inform the user it has started the data transfer and show the progress. If the remote connection to the server system has been formed over a costly or slow connection, the device 110 may ask the user for a permission to start the transfer. A message may be received to the user (to the electronic device 110) containing links or codes for installing the application and/or for accessing the transfer session (the session token).

An application may be developed and/or connected to a network service platform. Such a platform may provide functionality for sharing data between devices and for sending and receiving notifications from electronic devices on which the applications are residing. Notification, for example the updating of the data transfer status and initiating related operations, may be provided directly by the operating system, that is, the application may not need to be running. In this way, such notifications can be directed to the correct application or the user interface of the device can be updated on the status of the background data transfer.

The data transfer by the system may utilize such notifications. For example, when the application is installed on the electronic device, it may register its identifier on the server system, and thus the server system can send and receive individual notifications from that application and device. This may be useful, for example, if the data transfer is for some reason interrupted and the data transfer session and its data is in danger of expiring on the server system (the data may have a certain time for which it is stored and then deleted). The server system can then "remind" the device and application that the second data set needs to be downloaded. In addition, such reminders may be sent by e-mail.

Figure 4:
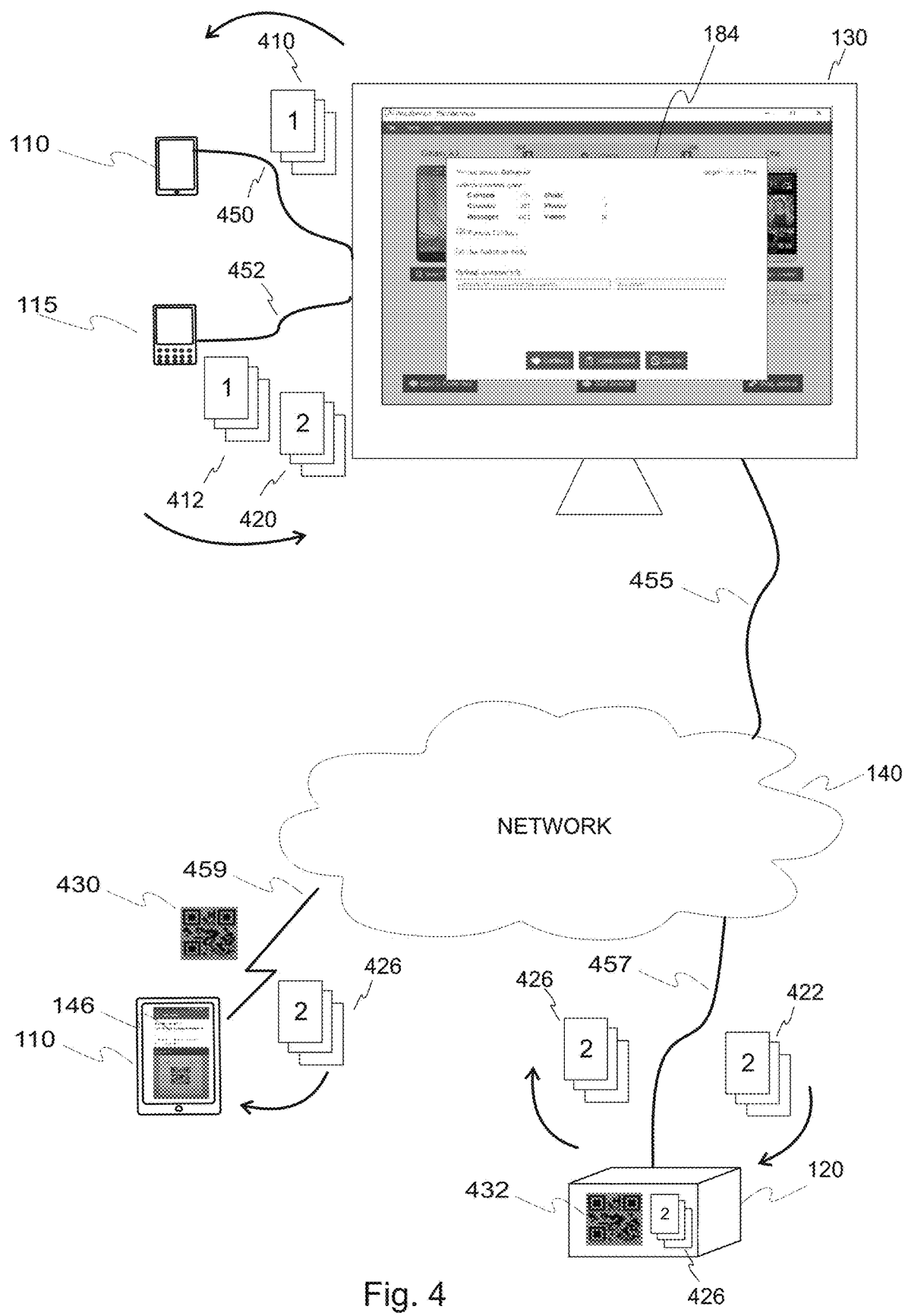
FIG. 4 illustrates storing and transfer of data in a system for data transfer between electronic devices.

FIG. 4 illustrates storing and transfer of data in a system for data transfer between electronic devices. In this example, the system comprises a data transfer host 130 and a data transfer server 120 connected to the network 140 and the first electronic device 110 and the second electronic device 115. In FIG. 4 example, the first electronic device 110 (the new device) and the second electronic device 115 (the old device) may be connected to a data transfer host 130 over any local communication connections, here in FIG. 4 shown as wired connections such as USB connections 450, 452. The data transfer host may be running an application 184 for controlling the data transfer. When the data transfer is started, the application 184 may display information of the data contained in the second electronic device 115 that can be transferred. The application 184 may receive input from the operator (user) to start the transfer. In response, the first set of data 410 is transferred from the second electronic device 115 to the data transfer host 130, and from the data transfer host 130 the first set of data 412 (practically, a copy of the data 410) is transferred to the first electronic device 110. At the data transfer host, the first set of data may be stored onto transitory memory or in non-transitory memory. The system may form a session token 430, 432 identifying the data transfer session between the first electronic device and the second electronic device. This session token may be transferred to the first electronic device 110. The system may also transfer a second set of data 420 from the second electronic device to the data transfer host 130 and further to the network server 120, or the second set of data (or its copy 422) may be directly stored to the network server 120 over the network connection 455, 457. Once the local communication connection 450 is not needed any more, it may be ended.

The second set of data 426 may reside at the network server in a non-transitory memory. The session token 432 may also reside at the network server. The system may establish a remote communication connection between the network server system 120 and the first electronic device 110 using the network connections 457, 459. For this, the session token 430 may be used by providing access to the network server 120, as explained earlier. The system may then transfer the second set of data 426 from the network server system 120 to the first electronic device 110 over the remote communication connection.

The system may decrypt encrypted second set of data by said network server system 120, and then transfer the second set of data in decrypted form to the first electronic device over said remote communication connection (possibly a secure connection), and store said second set of data into the first electronic device. In the decryption, the session token may be used. It is to be noted that the server 120 may not necessarily have the session token (decryption key) before it is provided from the first electronic device. Alternatively, the server may have the session token and/or the session key, and it may use the session token transfer the second set of data to the first electronic device.

The various embodiments of the present disclosure can be implemented with the help of computer program code that resides in a memory and causes the relevant devices to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

A computer program product for controlling one or more electronic devices may be embodied on a non-transitory computer readable medium, and may comprise computer program code configured to, when executed on at least one processor, cause an apparatus or a system to establish a local data transfer connection in a data transfer session between the electronic device and a second electronic device, transfer a first set of data from the second electronic device to the electronic device over the local communication connection, end the local communication connection, use a session token to establish a remote communication connection in the data transfer session between a network server system and the electronic device, the session token identifying a data transfer session between the electronic device and the second electronic device, and transfer in the data transfer session a second set of data from the network server system to the electronic device over the remote communication connection, the second set of data originating from the second electronic device.

A computer program product for controlling one or more electronic devices may be embodied on a non-transitory computer readable medium, and may comprise computer program code configured to, when executed on at least one processor, cause an apparatus or a system to form a session token, the session token identifying a data transfer session between the first electronic device and the second electronic device, establish a local data transfer connection in the data transfer session between the first electronic device and the second electronic device, transfer a first set of data from the second electronic device to the first electronic device over the local communication connection, end the local communication connection, transfer in the data transfer session a second set of data from the second electronic device to a network server system, establish a remote communication connection in the data transfer session between the network server system and the first electronic device, and transfer in the data transfer session the second set of data from the network server system to the first electronic device over the remote communication connection.

A computer program product as described above may comprise computer program code for causing a device or a system to carry out the method as described in the context of FIGS. 2a, 2b and 2c.

It is obvious that the present disclosure is not limited solely to the above-presented embodiments, but it can be modified within the scope of the appended claims.

The invention claimed is:

1. A method for transferring data between a first electronic device and a second electronic device, comprising:
    forming a session token, said session token identifying a data transfer session between said first electronic device and said second electronic device,
    establishing a local data transfer connection in said data transfer session between said first electronic device and said second electronic device,
    transferring a first set of data from said second electronic device to said first electronic device over said local communication connection, wherein said first set of data comprises data units having a first size;
    transferring in said data transfer session a second set of data from said second electronic device to a network server system, wherein said second set of data comprises data units having a second size which is larger than the first size;
    establishing a remote communication connection in said data transfer session between said network server system and said first electronic device,
    transferring in said data transfer session said second set of data from said network server system to said first electronic device over said remote communication connection;
    encrypting said second set of data at least partially by using a session encryption key, said session encryption key being related to said session token;
    decrypting the encrypted second set of data by a third device, said third device being connected to said first electronic device over a local communication connection; and
    storing said second set of data in said first electronic device.

2. A method according to claim 1, comprising:
    decrypting said encrypted second set of data by said first electronic device, and
    storing said second set of data in said first electronic device.

3. A method according to claim 1, comprising:
    decrypting said encrypted second set of data by said network server system,
    transferring said second set of data to said first electronic device over said remote communication connection, and
    storing said second set of data in said first electronic device.

4. A method according to claim 1, comprising:
    using said session token as said session encryption key.

5. A method according to claim 1, comprising:
    forming said session encryption key by a key forming algorithm using said session token as a seed.

6. A method according to claim 1, wherein said local communication connection comprises at least one or a combination of the group of a wired connection, a short-range radio connection, an optical connection and a local area network connection.

7. A method according to claim 1, comprising:
transferring said session token to said first electronic device over said local communication connection, and
using said session token in forming said remote communication connection and/or in decrypting data.

8. A method according to claim 1, comprising:
storing said session token into a network server system,
using said session token for said transferring of said second set of data to said first electronic device.

9. A method according to claim 1, wherein said first set of data comprises one or more of
contacts;
calendar;
messages; and
bookmarks;
and said second set of data comprises one or more of
photographs;
videos; and
music files.

10. A system comprising at least one processor, memory including computer program code, the memory and the computer program code configured to, with the at least one processor, cause the system to perform at least the following:
form a session token, said session token identifying a data transfer session between a first electronic device and a second electronic device,
establish a local data transfer connection in said data transfer session between said first electronic device and said second electronic device,
transfer a first set of data from said second electronic device to said first electronic device over said local communication connection, wherein said first set of data comprises data units having a first size;
end said local communication connection,
transfer in said data transfer session a second set of data from said second electronic device to a network server system, wherein said second set of data comprises data units having a second size which is larger than the first size;
establish a remote communication connection in said data transfer session between said network server system and said first electronic device;
transfer in said data transfer session said second set of data from said network server system to said first electronic device over said remote communication connection;
encrypt said second set of data at least partially by using a session encryption key, said session encryption key being related to said session token;
decrypt the encrypted second set of data by a third device, said third device being connected to said first electronic device over a local communication connection; and
store said second set of data in said first electronic device.

11. A system according to claim 10, comprising computer program code to cause the system to:
decrypt said encrypted second set of data by said network server system,
transfer said second set of data to said first electronic device over said remote communication connection, and
store said second set of data in said first electronic device.

12. A system according to claim 10, comprising computer program code to cause the system to:
transfer said session token to said first electronic device over said local communication connection, and
use said session token to form said remote communication connection and/or in decrypting data.

13. A system according to claim 10, comprising computer program code to cause the system to:
store said session token into a network server system,
use said session token to transfer said second set of data to said first electronic device.

14. A computer program product embodied on a non-transitory computer readable medium, comprising computer program code configured to, when executed on at least one processor, cause an apparatus or a system to:
form a session token, said session token identifying a data transfer session between a first electronic device and a second electronic device,
establish a local data transfer connection in said data transfer session between said first electronic device and said second electronic device,
transfer a first set of data from said second electronic device to said first electronic device over said local communication connection, wherein said first set of data comprises data units having a first size;
end said local communication connection,
transfer in said data transfer session a second set of data from said second electronic device to a network server system, wherein said second set of data comprises data units having a second size which is larger than the first size;
establish a remote communication connection in said data transfer session between said network server system and said first electronic device;
transfer in said data transfer session said second set of data from said network server system to said first electronic device over said remote communication connection;
encrypt said second set of data at least partially by using a session encryption key, said session encryption key being related to said session token;
decrypt the encrypted second set of data by a third device, said third device being connected to said first electronic device over a local communication connection; and
store said second set of data in said first electronic device.

* * * * *